Jan. 21, 1930.  G. LUFKIN  1,744,397
PROCESS AND APPARATUS FOR PRODUCING GRANULATED CULLET
Filed March 17, 1926
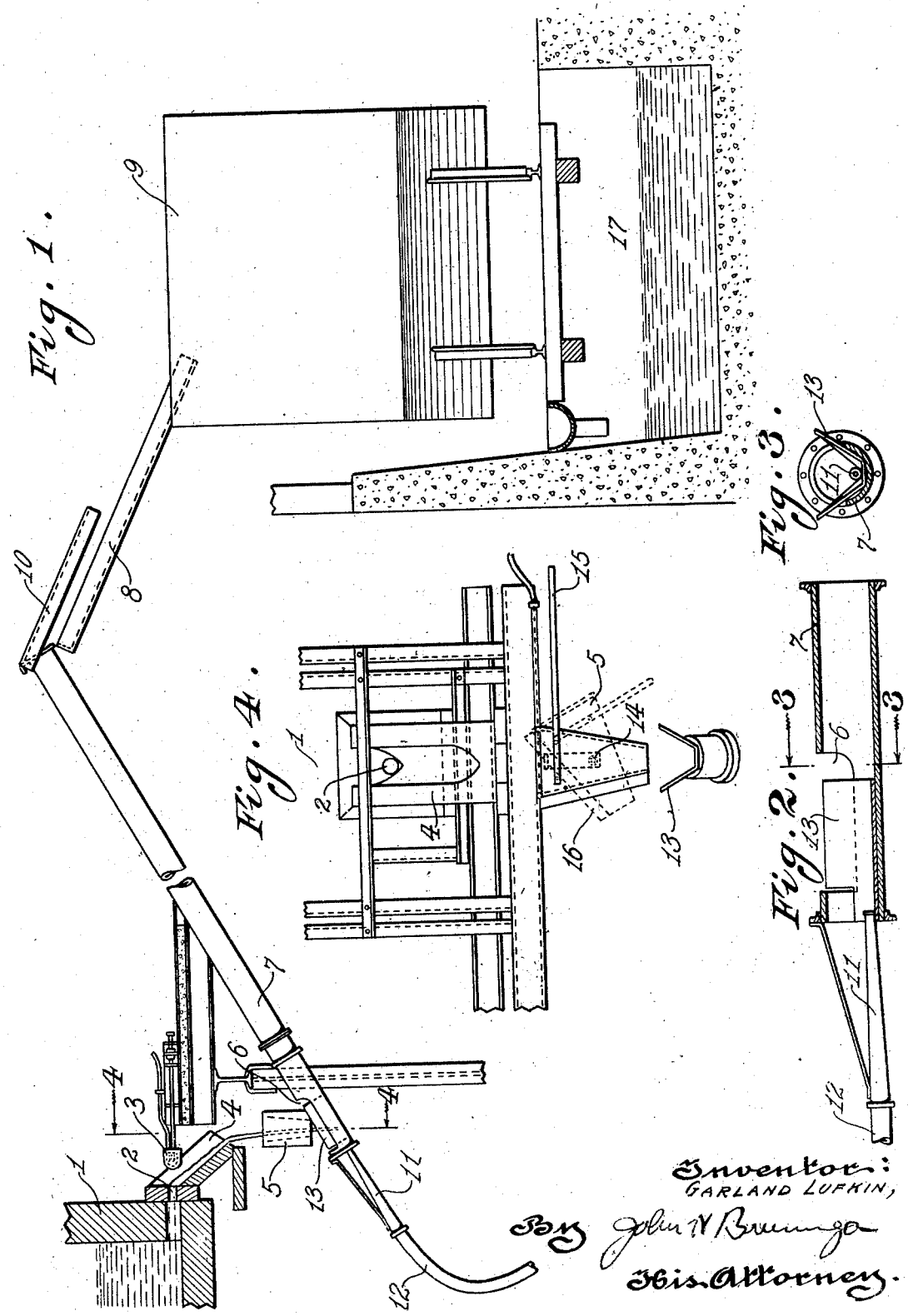
Inventor:
GARLAND LUFKIN,
By John W Bruninga
His Attorney.

Patented Jan. 21, 1930

1,744,397

UNITED STATES PATENT OFFICE

GARLAND LUFKIN, OF ALTON, ILLINOIS, ASSIGNOR TO ILLINOIS GLASS COMPANY, OF ALTON, ILLINOIS, A CORPORATION OF ILLINOIS

PROCESS AND APPARATUS FOR PRODUCING GRANULATED CULLET

Application filed March 17, 1926. Serial No. 95,358.

This invention pertains to a method and apparatus for handling glass, and more particularly for tapping a glass furnace.

In the usual glass-blowing establishment, the glass is retained in a molten condition in a suitable tank or reservoir from which it is drawn as required. When the operation of the plant is shut down for any reason, if the glass in the reservoir should be allowed to cool and become solid it would be necessary before resuming operations to remelt the same. As it is impractical to attempt to remelt such a solidified bed of glass in place, it would be necessary to break the glass out of the tank by means of picks or the like. This is a very tedious and expensive operation.

One of the objects of this invention, therefore, is to provide a method and apparatus for removing the molten glass from the tank when the plant is shut down, which will put the cullet into such condition that it can readily be remelted when operations are resumed.

Another object is to provide a method and apparatus for transforming the molten glass to granulated cullet.

Further objects will appear from the following description taken in connection with the accompanying drawing, in which:

Figure 1 is a view in elevation with parts in section of an apparatus for handling glass embodying this invention and adapted for carrying out the method thereof;

Figure 2 is an enlarged detail partly in section of the trough which receives the stream of molten glass;

Figure 3 is a section on line 3—3 of Figure 2; and

Figure 4 is an enlarged section on line 4—4 of Figure 1.

In accordance with this invention the molten glass is removed from the storage tank by permitting the same to flow therefrom in a continuous stream. This stream is suitably guided into a flowing stream of water. The contact between the glass and the water has the effect of suddenly chilling the glass which causes the same to solidify and at the same time breaks it up into granulated cullet. In the preferred embodiment, a jet of water is caused to impinge forcibly upon the flowing stream of molten glass. The effect of such contact is to solidify and comminute the glass to a cullet having the form of rock salt. This granulated cullet is then in a condition to be remelted in the ordinary way.

Referring to the accompanying drawing, 1 designates the storage tank or reservoir in which the molten glass is retained during normal operation. This tank is provided with a suitable orifice 2 having a plug 3 adapted to close the same during normal operation of the plant. Leading from the orifice 2 is a trough or chute 4 adapted to deliver a stream of molten glass to a funnel or guide 5. This guide is placed over an opening 6 in a trough or conduit 7 placed therebelow. The conduit 7 extends upwardly from a point below the guide 5 at a suitable angle and discharges into another chute 8 which is adapted to convey the comminuted cullet to a suitable receiving car 9. A baffle 10 at the end of the conduit 7 assists in controlling the discharge thereof.

Mounted in the lower end of the conduit 7 and adjacent the opening 6 is a nozzle 11 which may be supplied with water under a suitable pressure by a hose 12 from any suitable source of supply. The nozzle 11 is mounted so as to direct a stream of water along the conduit 7. An auxiliary trough 13 may be set in the opening 6 and is provided with flared sides adapted to deflect any glass falling thereon toward the stream from the nozzle 11 which is directed along the bottom of said trough. The guide 5 may be mounted on a pivot 14 and provided with a suitable handle 15 by which it may be swung to one side when it is desired to direct the glass away from the conduit 7. Guide flanges 16 may be provided on one side of the funnel so as to guide the stream of molten glass clear of the conduit 7.

In the operation of this device the plug 3 may be removed from the orifice 2 as shown in Figure 1 so as to permit the molten glass to flow from said orifice down the chute 4 and into the funnel 5. This funnel guides the stream into the trough 13 where it impinges upon the jet of water flowing from the nozzle 11. The glass is thereby chilled and broken up into a granulated cullet which is carried by the flowing stream of water upwardly along conduit 7 to be discharged into the chute 8 and thereby into the receiver 9. The receiver 9 may be a car as shown in Figure 1, or any other suitable receptacle, and is preferably provided with drain openings to permit the water to be drained therefrom while the cullet is retained. A suitable tank 17 may be provided to receive the water drained from the receptacle 9.

If it should be desired to remove the glass from the tank without comminuting the same, the funnel 5 may be tipped on its pivot 14 as illustrated in dotted lines in Figure 4. When in this position the stream of glass will impinge upon the side of the funnel, flowing down between the guides 16 to the floor underneath the furnace or to any other suitable place provided to receive the same.

It will be seen that in accordance with the method of this invention the glass is reduced to the condition of a granulated cullet by a very simple process. The chilling effect of the contact between the molten glass and water acts not only to cause the glass to solidify, but also to cause the same to break up into small particles. These particles are at once caught up by the flowing stream of water in the conduit 7 and carried away to the receiver 9. The process is thus continuous and may be kept in operation until the tank 1 is entirely emptied of molten glass. The glass is not only comminuted but is actually delivered to a storage receiver where it may be held until it is desired to remelt the same. The water is drained from the cullet in the receiver so as to render the same practically dry and ready for future operations. It will be seen also that the apparatus provided for carrying out this process is extremely simple and cheap to install and operate.

It is obvious that various changes may be made in the details of construction without departure from the spirit of this invention; it is to be understood, therefore, that this invention is not limited to the specific details shown and described.

Having thus described the invention, what is claimed is:

1. In the art of handling glass, the process comprising, reducing the glass to cullet by bringing the molten glass into contact with a flowing stream of water and causing the water to carry and elevate the cullet so formed to a higher level.

2. In the art of handling glass, the process comprising, directing a jet of water upwardly inclined and forcibly against a downwardly flowing stream of molten glass, thereby to granulate and elevate said glass.

3. In the art of handling glass, the process comprising, flowing a stream of molten glass on an upwardly inclined flowing stream of water and forcing the water with sufficient velocity to carry the cullet so formed to a higher level.

4. An apparatus for tapping a glass furnace to produce granulated cullet comprising, means for guiding the glass stream flowing from the furnace, means for directing a water stream transversely of and into the path of the glass stream and means for guiding the water stream in an upwardly inclined path to carry off and elevate the cullet to a higher level.

5. An apparatus for tapping a glass furnace to produce granulated cullet comprising, means for guiding the glass stream flowing from the furnace, an upwardly inclined conduit extending transversely of and positioned to receive and confine the glass stream at the lower end of said stream, and means for directing a water stream upwardly along said conduit to intersect the glass stream.

6. An apparatus for handling glass flowing from a molten source of supply, comprising, an upwardly inclined conduit, means for directing a water stream upwardly along said conduit, and means for directing the glass stream into the lower end of said conduit.

7. An apparatus for handling glass flowing from a molten source of supply comprising, an upwardly inclined pipe having an opening at its lower end, means for directing a water stream upwardly along said pipe from below said opening, and means for directing the glass stream into the pipe opening.

In testimony whereof I affix my signature this 1st day of March, 1926.

GARLAND LUFKIN.